United States Patent [19]

Heintz et al.

[11] Patent Number: 5,485,381
[45] Date of Patent: Jan. 16, 1996

[54] NAVIGATION SYSTEM FOR LAND VEHICLES

[75] Inventors: Frieder Heintz, Ettlingen; Hermann Winner; Georg Geiser, both of Karlsruhe, all of Germany

[73] Assignee: Robert Bosch GmbH, Stuttgart, Germany

[21] Appl. No.: 140,006

[22] PCT Filed: Feb. 4, 1993

[86] PCT No.: PCT/DE93/00094

§ 371 Date: Oct. 22, 1993

§ 102(e) Date: Oct. 22, 1993

[87] PCT Pub. No.: WO93/17406

PCT Pub. Date: Sep. 2, 1993

[30] Foreign Application Priority Data

Feb. 27, 1992 [DE] Germany ............. 42 05 979.8

[51] Int. Cl.[6] ................................. G06F 165/00
[52] U.S. Cl. ............ 364/426.04; 364/449; 364/461; 340/435; 180/170; 180/179
[58] Field of Search ..................... 364/443, 449, 364/426.04, 461; 340/988, 435, 990, 903, 995; 73/178 R; 180/170, 179; 123/352

[56] References Cited

U.S. PATENT DOCUMENTS

| | | | |
|---|---|---|---|
| 5,146,219 | 9/1992 | Zechnall | 340/995 |
| 5,229,941 | 7/1993 | Hattori | 364/424 |
| 5,230,400 | 7/1993 | Kakinami et al. | 364/461 |
| 5,315,295 | 5/1994 | Fujii | 340/988 |

FOREIGN PATENT DOCUMENTS

| | | |
|---|---|---|
| 0487280 | 5/1992 | European Pat. Off. . |
| 3912353 | 11/1989 | Germany . |
| 4201142 | 8/1992 | Germany . |

*Primary Examiner*—Gary Chin
*Attorney, Agent, or Firm*—Kenyon & Kenyon

[57] ABSTRACT

A navigation device for land vehicles, particularly for passenger cars and trucks, is proposed which has a storage for geographical data, sensors for detecting actual travel data, a comparison device, and an information delivery device. The navigation device is characterized by the fact that the limit speed ($v_i$) safe for travel over the path of travel is determined in a calculating unit (9) from the geographical data concerning the course of the path of the travel and is compared with the instantaneous speed of the vehicle. When the limit speed is exceeded in positive or negative direction, an information delivery device (11) is activated and possibly also a conversion device (13), they acting on setting members, for instance brakes or engine control of the vehicle.

7 Claims, 5 Drawing Sheets

NAVIGATION SYSTEM FOR LAND VEHICLES

BACKGROUND OF THE INVENTION

The present invention relates to a navigation device for land vehicles, particularly passenger cars and trucks, having a storage for geographical data, sensors for detecting existing travel data, a comparison device, and an information delivery device. The present invention is also related to a method of providing road information to drivers of land vehicles in which geographical data are compared with actual travel data, and, in the event of dangerous situations, a warning is given to the driver.

Navigation devices for land vehicles, also referred to as orientation systems, are known. They assist the driver of the vehicle in finding his way in unknown territories and furthermore of timely noting dangers.

In the known devices, danger-relevant data from the information with regard to the road being traveled are stored, as well as recommended speeds which should be complied with in these regions. It is readily apparent that with the large amount of information which may have to be made available to the driver by such devices, extensive storage devices must be provided, which makes it difficult to integrate such devices in land vehicles, and at least result in a high cost for such systems. Hence, there is a need for a land vehicle navigation device which has reduced storage requirements but which remains safe.

SUMMARY OF THE INVENTION

The navigation device in accordance with the present invention as well as the method of the present invention for supplying road information have the advantage over the foregoing in that the need for storage is reduced, so that easier integration in land vehicles at reduced cost is possible, without leading to a reduction in the safety of traffic.

Since safety-relevant data, for instance the limit speed, for travel over a future path are calculated from the geographical data stored by the navigation device, the storing of such data is no longer necessary, without reducing the safety of the system or the method of the present invention. For this purpose the navigation device has a calculating unit which determines the limit speed for the further travel from geographical data concerning the course of the road. A comparison device serves to compare the instantaneous speed of the vehicle with the calculated limit speed and possibly activate and information delivery device which advises the driver of a difference between the instantaneous speed and the limit speed.

A preferred embodiment of the navigation device is characterized by a calculation unit which, for the determination of a safe limit speed which should be complied with for travel over a path lying in front of the vehicle, evaluates edges and angles of a fixed reference system by which the section of the road between two base points is defined. From the length of an edge piece, the curvature associated with the one base point can be calculated and from this there can be determined the limit speed at which this portion of the road can be safely traveled over. At this speed, therefore, the maximum adhesion coefficient is not exceeded, so that the vehicle does not skid. Therefore, assurance is furthermore had that a maximum transverse acceleration of the vehicle cannot be exceeded. A comparison device of the navigation system compares the instantaneous speed of the vehicle with the calculated limit speed and, in the event of a difference between the two, activates the information delivery device so that the driver is warned of threatened dangers.

In a preferred embodiment of the navigation device, a conversion device can be activated jointly with the information device or as an alternative to it, it controlling setting members of the vehicle, for instance displacing an electronic gas pedal in such a manner that the vehicle is decelerated. It is also possible for an automatic transmission to be controlled or for the brakes of the vehicle to be placed in action.

Other possible developments of the navigation device are discussed in the DETAILED DESCRIPTION.

In one preferred embodiment of the method of the present invention, data concerning the road traveled are stored as edges and angles of a fixed reference system which describe the path between two base points. Such data with regard to travel paths are available for known navigation systems and can therefore be used easily and at relatively little expense for the system described here. The length of an edge piece is used in the calculation of a curvature, which is then taken as basis for the determination of the limit speed associated with this edge piece. In other words, the limit speed for a section of road can be calculated simply on basis of data which are already available, It is no longer necessary to store additional information with regard to this travel path and particularly not to store a speed recommended for travel over said section. Rather, it is possible to calculate this information during travel and possibly make it available to the driver.

In another preferred embodiment of the method of the present invention, the limit speed is obtained in the following manner. The difference between the theoretical linear continuation of the instantaneous direction of travel and the line connecting the instantaneous position of the vehicle and a stopping point lying on the actual future path of travel which is reached upon the braking of the vehicle is determined. Based on the geographical data concerning the path of travel stored in the navigation device and on the determination of the braking path based on a given instantaneous speed, the stopping point of the vehicle on the actual path of travel can be readily determined at any time without it being necessary to store additional information in the navigation device. The angle formed between the linear continuation and the connecting line is compared with a limit angle upon the exceeding of which the calculated stopping point of the vehicle lies beyond the range of vision of a curved section of road lying ahead. By a comparison of the limit speed with the instantaneous speed of the vehicle, a warning can be given to the driver if there is a difference between them. In this connection, it is therefore not necessary for a maximum speed established for the section of road in question to be stored. It is rather possible to calculate it during travel, without this resulting in any reduction in safety for the driver.

BRIEF DESCRIPTION OF THE DRAWING

The present invention will be explained in further detail below with reference to the drawing.

DETAILED DESCRIPTION

Figure 1:
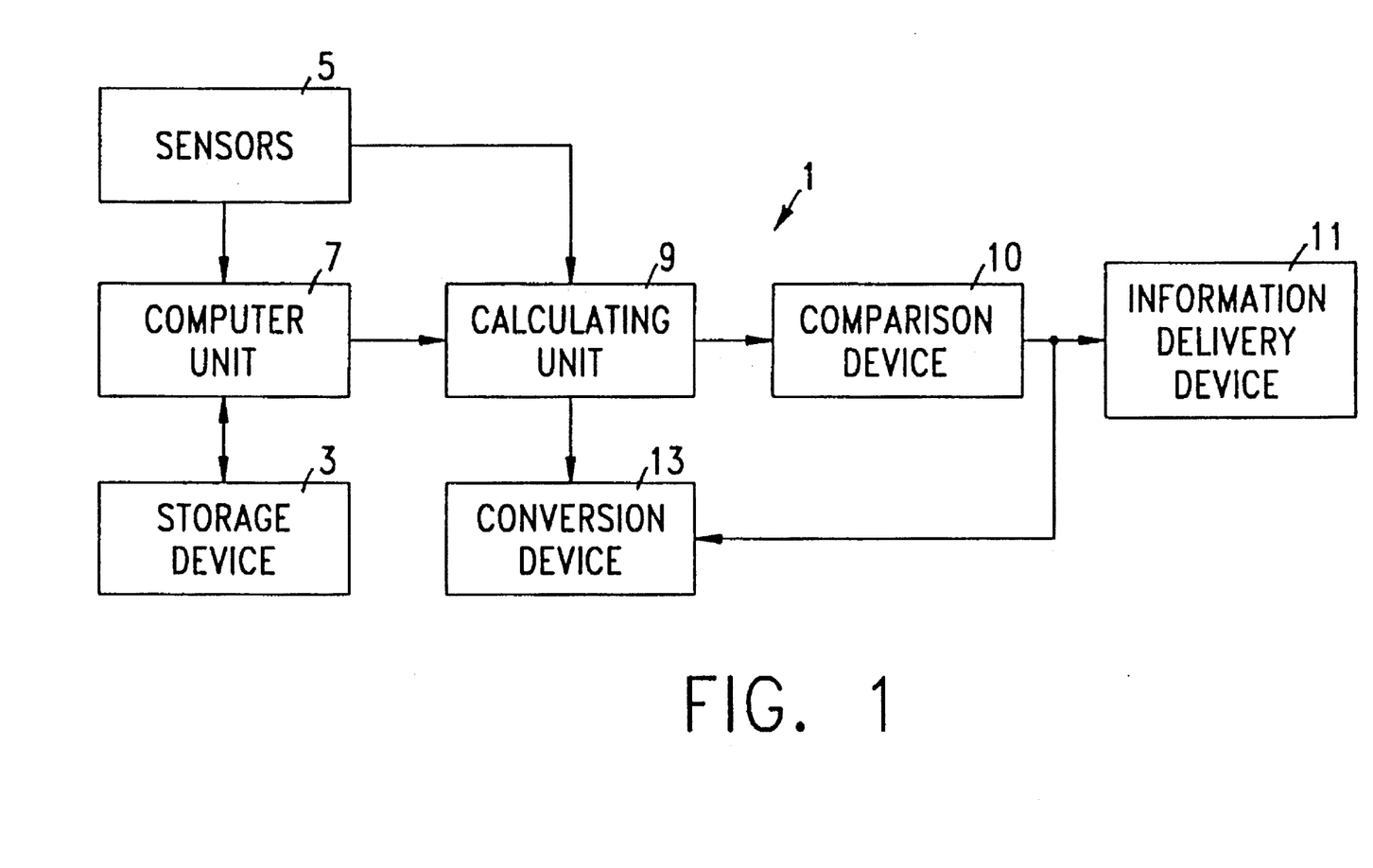
FIG. 1 is a schematic block diagram of a navigation device.

FIG. 1 shows diagrammatically a block diagram of a navigation device 1 which has a storage 3 for geographical data and sensors 5 for detecting actual travel data. Storage 3 and sensors 5 are connected to a computer unit 7 referred to as travel pilot. The navigation device furthermore has a calculating unit 9 to which output signals of the sensors 5 and of the computer unit 7 are fed. Output signals of the calculation unit 9 are fed to a comparison device 10 and then to an information delivery device 11, and to a conversion device 13.

Data concerning the network of roads to be traveled are contained in the storage 3. Optical storage means, for instance CD ROMs have proven particularly excellent here. The geographical data which are relevant for an up-to-date section of map, and therefore for the distance over which the land vehicle is moving, are transmitted in each case to the computer unit 7.

The sensors 5 detect relevant data for the computer unit 7. For example, the instantaneous speed of the land vehicle is determined via wheel sensors. Other sensors can, for instance, determine the ambient temperature or other environmental conditions, indirect detection being also possible. Wetness of the road can be determined, for instance, in the manner that the operation at the time of the windshield wiper of the vehicle is determined. In case of intermittent switching, less wetness of the road is to be expected, while in case of maximum speed of the windshield wiper extensive wetness is to be expected. Light conditions can, for instance, be determined via suitable sensors, but also via the instantaneous condition of the switch of the lighting system of the land vehicle. Finally, the sensors can also include a compass. On basis of the data determined by the sensors, the computer unit 7 can then calculate the distance traveled over by the land vehicle and its direction.

Based on the output signals of the sensors 5, the calculating unit 9 can calculate the instantaneous speed of the vehicle. The corresponding output signals of the sensors are fed to the calculating unit 9, as indicated by an arrow in FIG. 1.

From the data present here, the computer unit 7 calculates the future travel path of the vehicle and provides a corresponding output signal, indicated by an arrow in FIG. 1, to the calculating unit 9. For the calculation of the future travel path, a route search can be helpful, which calculates one or more travel routes to a destination entered by the driver based on the existing position.

The calculating unit 9 serves to calculate a limit speed relevant for the future path. The different types of calculation are explained in more detail below. In the comparison device 10 a so-called danger calculation is effected which is based, in particular, on a comparison of the existing speed of the vehicle with a limit speed which has been determined by the calculating unit 9. If the instantaneous speed of the vehicle should differ from the limit speed, an output signal can, on the one hand, be provided to the information device 11 while, on the other hand, a corresponding signal can be provided to the conversion device 13. The information delivery device 11 can indicate, optically and/or acoustically, to the driver the existence of a threatened danger, which, furthermore, can also be based on the fact that the instantaneous speed lies below a desired limit speed.

In the event of deviations of the instantaneous speed from the limit speed, setting members of the vehicle can also be directly actuated via the conversion device 13. For example, when the limit speed is exceeded, reduction of the existing speed of the vehicle is possible by action on the engine control or on the braking system of the motor vehicle. On the other hand, acceleration of the vehicle can possibly also be effected by action on the engine control should the situation require this.

The individual possibilities of action will be explained in greater detail below.

A first embodiment of a method of calculating the limit speed will be explained on basis of FIG. 2.

The geographical data with respect to the road are reproduced by a linking of edges $K_i$ with the corresponding angle $\alpha_i$ (in radians) of a fixed reference system, which describe a length of road between two base points $r_i$ $(x_i, y_i)$ and $r_{i+1}$ $(x_{i+1}, Y_{i+1})$. In the development of an electronic map, base points are generally entered when the angle $\alpha_i$ of a corresponding edge region changes by $\pm\beta$ as compared with the angle $\alpha_{i-1}$ of the preceding edge or when the edge length s has reached a maximum value $s_{max}$. This, therefore means that the electronic map placed in the storage describes a travel path by individual edge regions.

The length of an edge between the base points $r_i$ and $r_{i+1}$ is designated $s_i$. From the data concerning the base point $r_i$ of this edge, the corresponding curvature value $C_i$ at the base point $r_i$ can be calculated in accordance with the equation:

$$C_i = 2(\alpha_i - \alpha_{i-1})/(s_i + s_{i-1})$$

From the curvature value of the section of road in the region of the base point $r_i$, the limit speed $v_i$ with which this section of the road can be traveled over without danger can be indicated. The limit speed is calculated by the equation $$v_i = \sqrt{(\mu g / C_i)}$$

In this equation, g is the acceleration of gravity and μ the maximum adhesion coefficient, which in general is not known. However, it can be estimated by one or more constant values which are stored in the suitable storage region. As calculation value μ=0.5 can, for instance, be used if the road is dry. The adhesion coefficient can be selected as a function of environmental data U. For instance, in the event of the danger of ice or of wetness, which can be recognized by the fact that the windshield wiper is turned on, an adhesion coefficient of μ=0.3 can be selected. The said values represent a lower estimate of the adhesion coefficient so that safety reserves are present.

By the fixing of a limit speed $V_i$ in a section of road defined by an edge $K_i$, the maximum transverse acceleration of the vehicle is also limited to a noncritical value.

Figure 2:
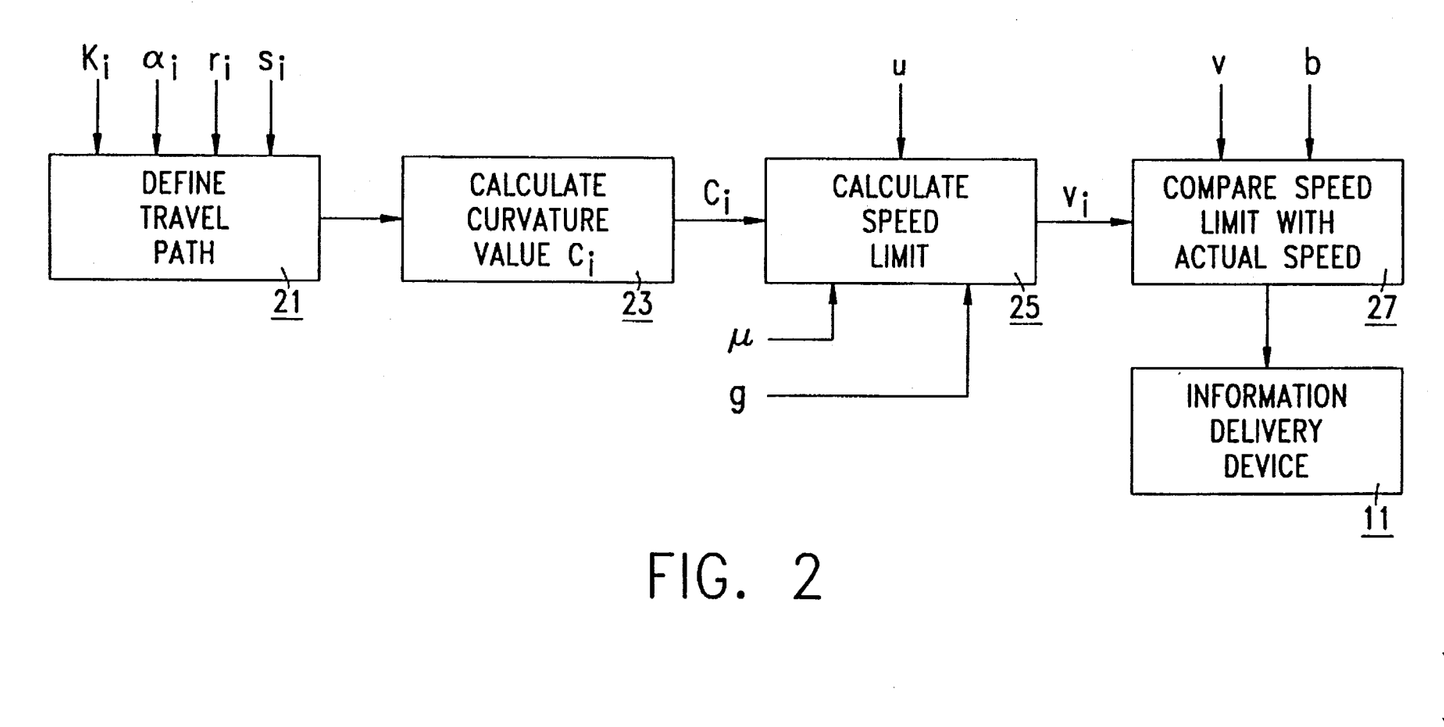
FIG. 2 is a schematic block diagram a first embodiment for the delivery of the road information.

From the individual data concerning the edges $K_i$, the corresponding angle $\alpha_i$, the corresponding base points $r_i$ and the edge lengths $s_i$, there is therefore defined as a whole the travel path which is placed in the storage 3 (see FIG. 1) and defined in the first block 21 in accordance with FIG. 2. In the second block 23 of FIG. 2, the calculation of the curvature value $C_i$ is effected in accordance with the equation set forth above. From the corresponding curvature values $C_i$, the limit speed $v_i$ is calculated in the next block 25 in accordance with the equation given above, using the adhesion coefficient μ and the acceleration of gravity g as well as the environmental data U. In a fourth block 27, the existing speed v is compared with the calculated limit speed $v_i$. In the event that the existing speed is faster or slower than the limit speed $v_i$, a warning can be given in suitable manner to the driver, for instance by the giving off of a corresponding signal to the information delivery device 11, which has been explained above in FIG. 1.

A meaningful warning of the driver is possible, in particular, if, in due time before reaching the portion of the road having a calculated limit speed, the actual speed of the vehicle has been adapted and therefore the speed reduced in due time before traveling over the corresponding section. At a target point, therefore, a given target speed $v_2$ which corresponds to the maximum speed $v_i$ is to be obtained. The vehicle is to be uniformly decelerated from an initial speed $v_1$ as a function of the distance s to the target point, in which connection a deceleration b is selected. This deceleration is also taken into consideration in the fourth block 27. The final speed of the vehicle should correspond to the limit speed upon reaching the target point. The variation in speed takes place in accordance with the equation $$v^2_1 = v^2_2 + 2bs$$

For moderate braking, a deceleration of b = 3 m/s² is assumed. Different deceleration values can be used here, including, for instance, one which is obtained by actuating the brake of the vehicle via the conversion device 13 in FIG. 1.

For all base points in front of the base point at which the limit speed is to be assumed, the permissible limit speed $v_i$ can be calculated. The smallest value $V_1 min$ of all values for $v_{1i}$ can be compared with the existing speed v of the vehicle. Should the latter be greater than the minimum value $v_{1min}$, the driver should be warned by the information delivery device 11. The setting members of the vehicle can be actuated, particularly the brake system, with a time delay or in due time by the conversion device 13.

Figure 3:
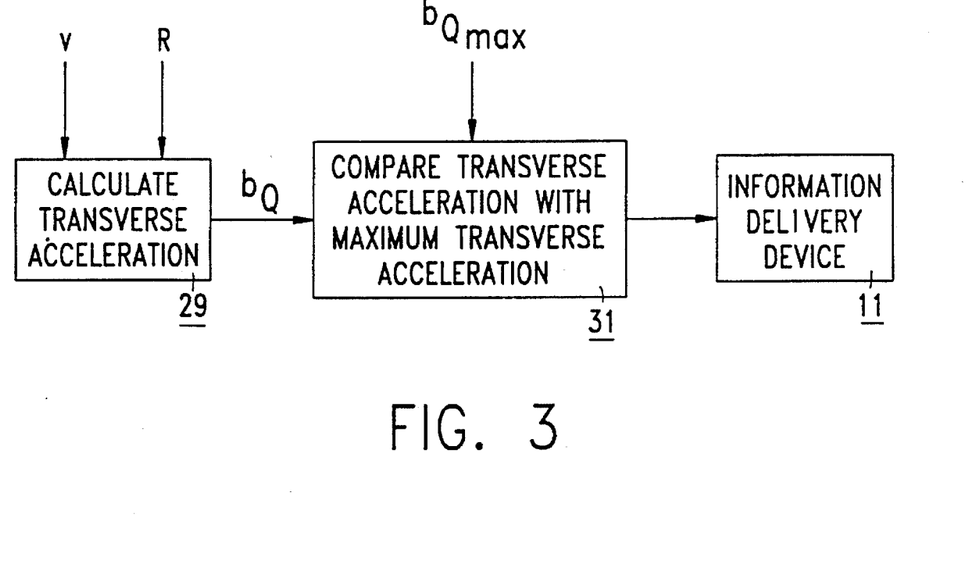
FIG. 3 is a diagram illustrating a further embodiment for the delivery of road information.

On the basis of FIG. 3, it will be explained that, within a first block 29, the transverse acceleration $b_Q$ of the vehicle can be calculated directly from the instantaneous speed and from the reconstructible radius R of a curve lying ahead. This value can be compared in a second block 31 with a predeterminable maximum value $b_{Qmax}$ of the transverse acceleration, and if an exceeding of the maximum transverse acceleration is evaluated, a warning signal given off to the driver. For this purpose, a corresponding warning signal is given off to the information delivery device 11 by the second block 31, which is developed as comparator.

On basis of FIG. 4 another embodiment of the calculation of the limit speed will be explained. The figure shows diagrammatically the course of a road S having a curve K. The vehicle is at the place $x_1$ and is moving with an instantaneous speed $v_{10}$. If the vehicle were braked with a deceleration b, the brake path $s_b$ would be:

$$S_b = V^2_{10}/2b$$

Under these given circumstances, the vehicle has reached the virtual stopping point $H_v$.

If the vehicle, with the same deceleration, follows the course of the road, it comes to a stop at the actual stopping point $H_r$. Between the theoretical linear continuation of the instantaneous direction of travel and the connecting line between the instantaneous position $x_1$ and the ideal stopping point $H_r$ in the region of the curve K there is the angle $\alpha$.

It is readily apparent that when a limit value $\alpha_o$ is exceeded the course of the curve can no longer be seen from the instantaneous position $x_1$. In other words, the actual stopping point $H_r$ of the vehicle lies outside the range of vision of the driver.

In this case, the limit velocity must be so adjusted that the speed of the vehicle is so adjusted for all travel situations that the actual stopping point $H_r$ always lies within the field of view of the driver. If it therefore turns out that the connecting line between an actual stopping point $H_r$ and the instantaneous position $x_1$ of the vehicle forms a larger angle $\alpha$ with the theoretical linear continuation of the direction of travel than $\alpha_o$, the speed of the vehicle must be reduced and a corresponding warning signal given to the driver.

Figure 5:
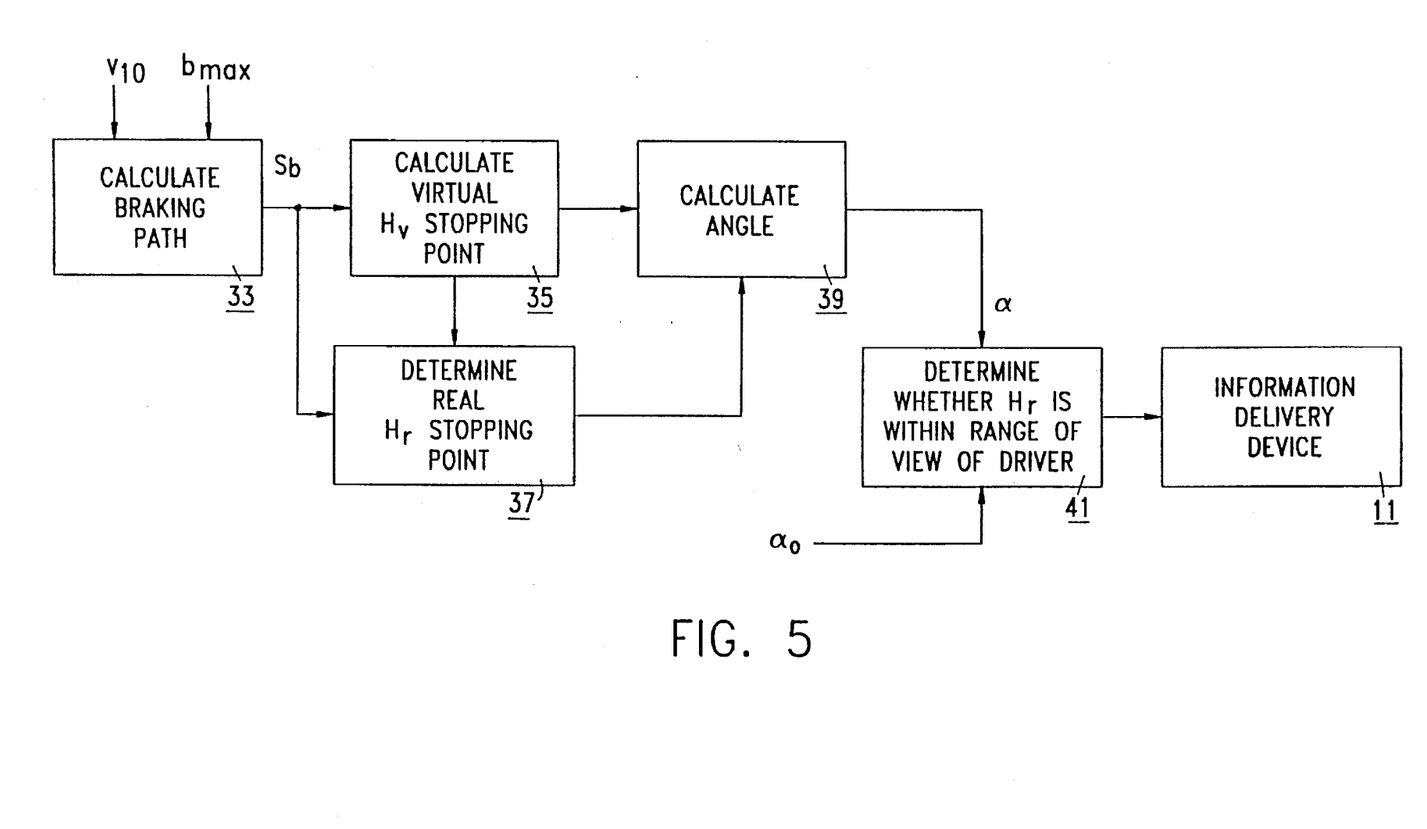
FIG. 5 is a schematic block diagram illustrating a further embodiment of a method for the giving of road information.

Such a function of the navigation device results from the diagram shown in FIG. 5.

In that case, the deceleration, here for instance the maximum deceleration $b_{max}$ of the vehicle, and its existing speed $v_{10}$ are introduced into a first block 33. From these values the braking path $s_b$ of the vehicle can be calculated and the virtual stopping point $H_v$ of the vehicle calculated in a second block 35. From the values with regard to the travel path stored in the storage 3 (see FIG. 1) the real stopping point $H_r$ can be determined on basis of the braking path $s_b$ in a third block 37.

In another block 39, the angle $\alpha$ can be calculated from the virtual and real stopping points.

Figure 4:
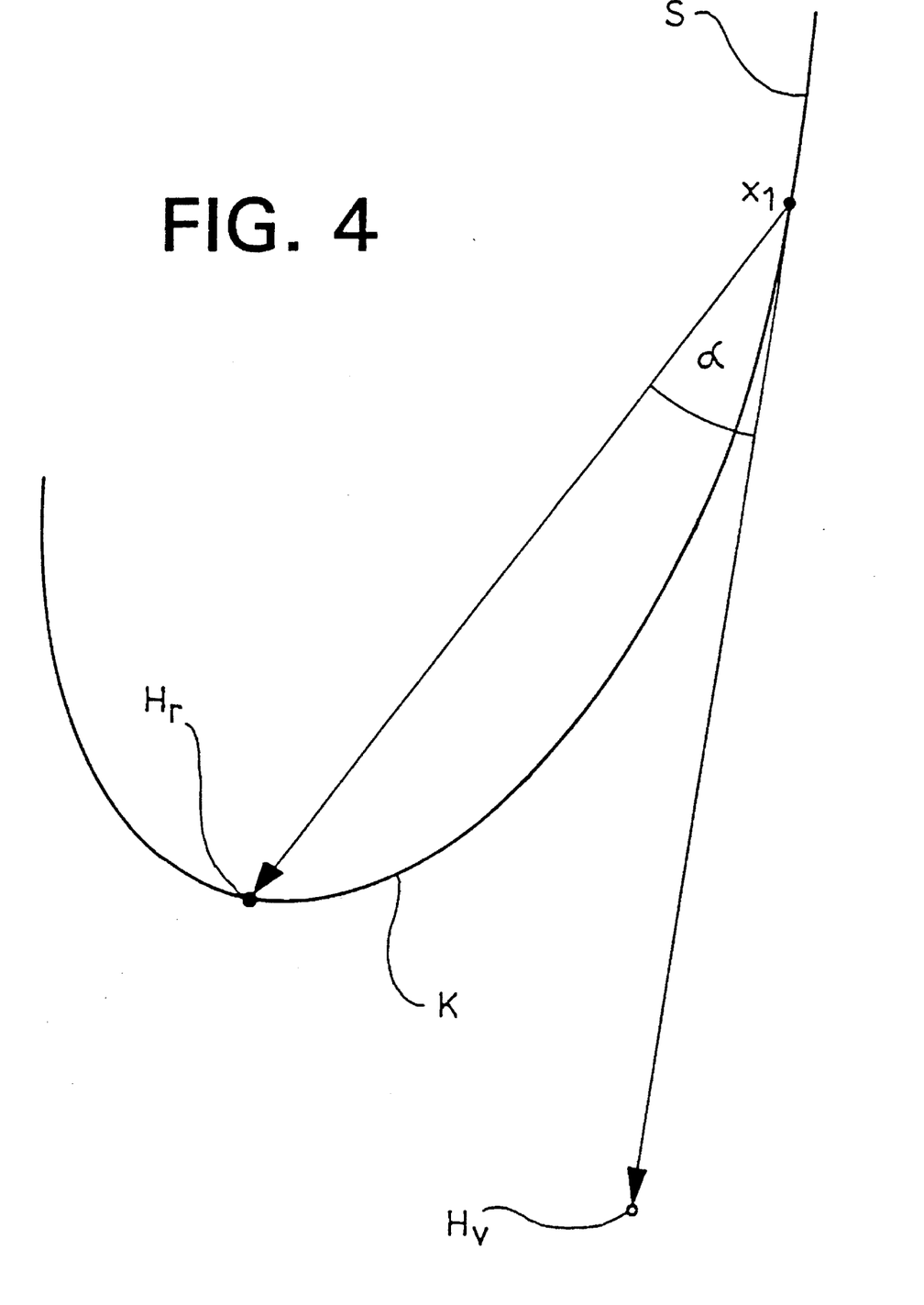
FIG. 4 represents a section of road illustrating the operation of the device illustrated in the diagram of FIG. 2.

By a comparison of the actual angle $\alpha$ with a limit value $\alpha_o$ effected in the fifth block 41, it can be determined whether the actual stopping point $H_r$ is still within the range of view of the driver or whether it is outside the visibility of a curved section of road K in front (see FIG. 4). In such case, by the giving off of a corresponding warning signal, the information delivery device 11 is actuated and the driver warned optically and/or acoustically. As in all the preceding cases, the conversion device 13 can be actuated simultaneously or with a time delay and the braking system of the vehicle for instance operated. The controlling of the engine electronics is possibly also sufficient to effect a deceleration of the vehicle, on the basis of which the real stopping point again lies within the range of vision of the driver.

From what has been stated above, it is readily evident that, with the aid of the navigation device and of the road-information delivery method, assurance is had that the driver does not exceed the maximum speed stipulated, when reaching a curved section of the road. In this connection, it is by no means necessary that the speeds given for a section of the road be stored in the storage 3 or in another corresponding storage of the navigation device 1. It is rather possible, by means of a calculating unit 9, to calculate the actual limit speed in each case and in this connection also take environmental influences such as ice, or wetness of the road into consideration. In this connection, not only is assurance provided that a maximum speed is not exceeded but it is also possible to specify a given minimum speed which is to be maintained for instance at the end of a curve. This is frequently the case in connection with acceleration lanes of a highway entrance. Therefore, when a driver approaches an entrance having an acceleration lane, he is induced to maintain a certain minimum speed so that a dependable threading into the new lane of travel is possible. Of course, by the method described and by means of the navigation device, he is warned if he approaches an entrance with or without acceleration lane at too high a speed. Differences between the instantaneous speed and a limit speed are therefore detected by the navigation system and indicated to the driver. In all cases, the driver is warned by the information delivery device. In addition, it is also possible via the conversion device to effect a change in the travel behavior by controlling the setting members of the vehicle. In this connection, on the one hand, the vehicle can be braked when a given maximum speed is exceeded and, on the other hand, an acceleration of the vehicle brought about when it is traveling with too low a speed, for instance in the region of an entrance with acceleration lane.

In all cases, the activating of the information delivery device can take place as a function of the instantaneous speed. Should the vehicle approach a place of danger at high speed, the warning of the driver would take place earlier than if the vehicle is traveling towards a place of danger at a lower speed. In addition, environmental influences can be taken into account in the warning given the driver. This means, therefore, that in the case of ice, for instance, an earlier warning is given the driver so that the speed is adjusted to a danger situation in due time.

Upon the activating of the information delivery device 11, a warning of the approaching danger can on the one hand be given in general in all the cases described here, but it is also possible for the driver to be concretely advised of the speed that is desired and therefore, for instance, of the limit speed for the section of the road ahead.

In view of this, it is clear that the navigation device can be developed as a program-controlled computer. In this way, a very compact development of the navigation device is possible so that integration is possible not only in trucks and passenger cars but also in motorcycles. In addition, it is possible to develop the navigation device as part of a control device of a land vehicle and combine it, for instance, with the control of the engine.

We claim:

1. A navigation device for a land vehicle comprising
   a) a storage device storing geographical data;
   b) sensors for detecting existing travel data;
   c) a calculating unit for calculating a safe driving speed of a particular section of road based on said geographical data stored in said storage device and for calculating an actual speed based on said travel data detected by said sensors;
   d) a comparison device for comparing said safe driving speed and said actual speed calculated by said calculating unit; and
   e) an information delivery system for indicating an unsafe condition if said actual driving speed is not within said safe driving speed,
   wherein said geographical data stored in said storage device includes road edges and associated angles which define a section of road between two base points,
   wherein a curvature value is determined based on a length of a road edge and its associated angle,
   wherein said safe driving speed is determined based on said curvature value, and
   wherein said calculating unit further:
   (i) determines a virtual stopping point from a current position based on said actual speed and a maximum deceleration value thereby defining a first line between said current position and said virtual stopping point;
   ii) determines an actual stopping point based on said actual speed, said maximum deceleration value, and said curvature of a future section of road thereby defining a second line between said current position and said actual stopping point; and
   (iii) determines an angle between said first line and said second line.

2. The navigation system of claim 1 further comprising a second comparison device for comparing said angle with a predetermined limit angle at which said actual stopping point lies beyond a range of visibility.

3. The navigation system of claim 2 wherein said information delivery system is activated when said actual speed is greater than a limit speed at which said angle is less than said predetermined limit angle.

4. The navigation system of claim 2 further comprising a conversion device for controlling setting members of said land vehicle based on the comparison made in said comparison device wherein said conversion device is activated when said actual speed is greater than a limit speed at which said angle is less than said predetermined limit angle.

5. The navigation device of claim 1 wherein said maximum deceleration value is based on environmental data determined by said sensors.

6. A method for providing road information to comprising the steps of:
   a) determining a limit speed to be maintained for safe travel over a length of road based on stored geographical data regarding the road;
   b) comparing said limit speed determined in step (a) with an actual speed;
   c) determining whether a dangerous condition exists based on the comparison of step (b); and
   d) warning said driver if a dangerous condition is determined to exist in step (c),
   wherein said step of determining said limit speed includes calculating a curvature value based on edges associated with a road and corresponding angles which are included in said stored geographical data, and
   wherein said step of determining said limit speed includes the sub-steps of:
   (i) determining a virtual stopping point from a current position based on said actual speed and a maximum deceleration value thereby defining a first line between said current position and said virtual stopping point;
   (ii) determining an actual stopping point based on said actual speed, said maximum deceleration value, and said curvature thereby defining a second line between said current position and said actual stopping point; and
   (iii) determining an angle between said first line and said second line.

7. The method of claim 6 wherein said step of determining said limit speed includes a further sub-step of:
   (v) comparing said angle with a predetermined limit angle defining the angle at which said actual stopping point lies beyond a range of visibility.

* * * * *

UNITED STATES PATENT AND TRADEMARK OFFICE
CERTIFICATE OF CORRECTION

PATENT NO. : 5,485,381
DATED : January 16, 1996
INVENTOR(S) : Frieder HEINTZ et al.

It is certified that error appears in the above-identified patent and that said Letters Patent is hereby corrected as shown below:

| Column | Line | |
|---|---|---|
| 8 | 24 | Before "comprising" insert --a driver of land vehicles--. |

Signed and Sealed this

Twenty-fourth Day of December, 1996

Attest:

BRUCE LEHMAN

Attesting Officer

Commissioner of Patents and Trademarks